(12) United States Patent
Ogino

(10) Patent No.: US 8,175,451 B2
(45) Date of Patent: May 8, 2012

(54) ELECTRONIC VIEWFINDER APPARATUS AND IMAGING APPARATUS

(75) Inventor: Yushi Ogino, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/054,324

(22) PCT Filed: Jul. 9, 2009

(86) PCT No.: PCT/JP2009/003207
§ 371 (c)(1),
(2), (4) Date: Jan. 14, 2011

(87) PCT Pub. No.: WO2010/007747
PCT Pub. Date: Jan. 21, 2010

(65) Prior Publication Data
US 2011/0116781 A1    May 19, 2011

(30) Foreign Application Priority Data

Jul. 18, 2008    (JP) .................................. 2008-186940

(51) Int. Cl.
*G03B 17/20* (2006.01)
(52) U.S. Cl. ........................................................ 396/296
(58) Field of Classification Search .................. 396/287, 396/296; 348/333.01
See application file for complete search history.

(56) References Cited

U.S. PATENT DOCUMENTS

| | | | |
|---|---|---|---|
| 5,499,053 A | 3/1996 | Itoh | |
| 2002/0167645 A1* | 11/2002 | Johnson | 353/20 |

FOREIGN PATENT DOCUMENTS

| | | |
|---|---|---|
| JP | 5-068189 | 3/1993 |
| JP | 6-141259 | 5/1994 |
| JP | 6-242435 | 9/1994 |
| JP | 7-064153 | 3/1995 |
| JP | 2002-267948 | 9/2002 |
| JP | 2003-161915 | 6/2003 |
| JP | 2003-204455 | 7/2003 |
| JP | 2008-070485 | 3/2008 |

OTHER PUBLICATIONS

Notification of Transmittal of Translation of the International Preliminary Report on Patentability (PCT/IB/338) mailed on Feb. 17, 2011 with PCT/IB/373 & PCT/ISA/237 for corresponding application PCT/JP2009/003207.
International Search Report of PCT Application No. PCT/JP2009/003207 dated on Sep. 15, 2009.

* cited by examiner

*Primary Examiner* — Christopher Mahoney
(74) *Attorney, Agent, or Firm* — Panasonic Patent Center; Dhiren Odedra; Kerry Culpepper

(57) ABSTRACT

The electronic viewfinder 3 includes a reflective type liquid crystal display 315, a finder optical system 32, and a transmission plate 34 that transmits a part of the optical image signal collected by the finder optical system 32 therethrough and reflects at least a part of a remaining optical image signal. The reflective type liquid crystal display 315 includes a light source 311 that emits light, a liquid crystal plate 315, a reflecting plate 316, and a polarizing plate 314. The transmission plate 34 is disposed to be inclined in a direction opposite to a inclined direction of the polarizing plate such that a transmission plane 341 thereof is not perpendicular to the optical axis of the finder optical system 32.

8 Claims, 13 Drawing Sheets

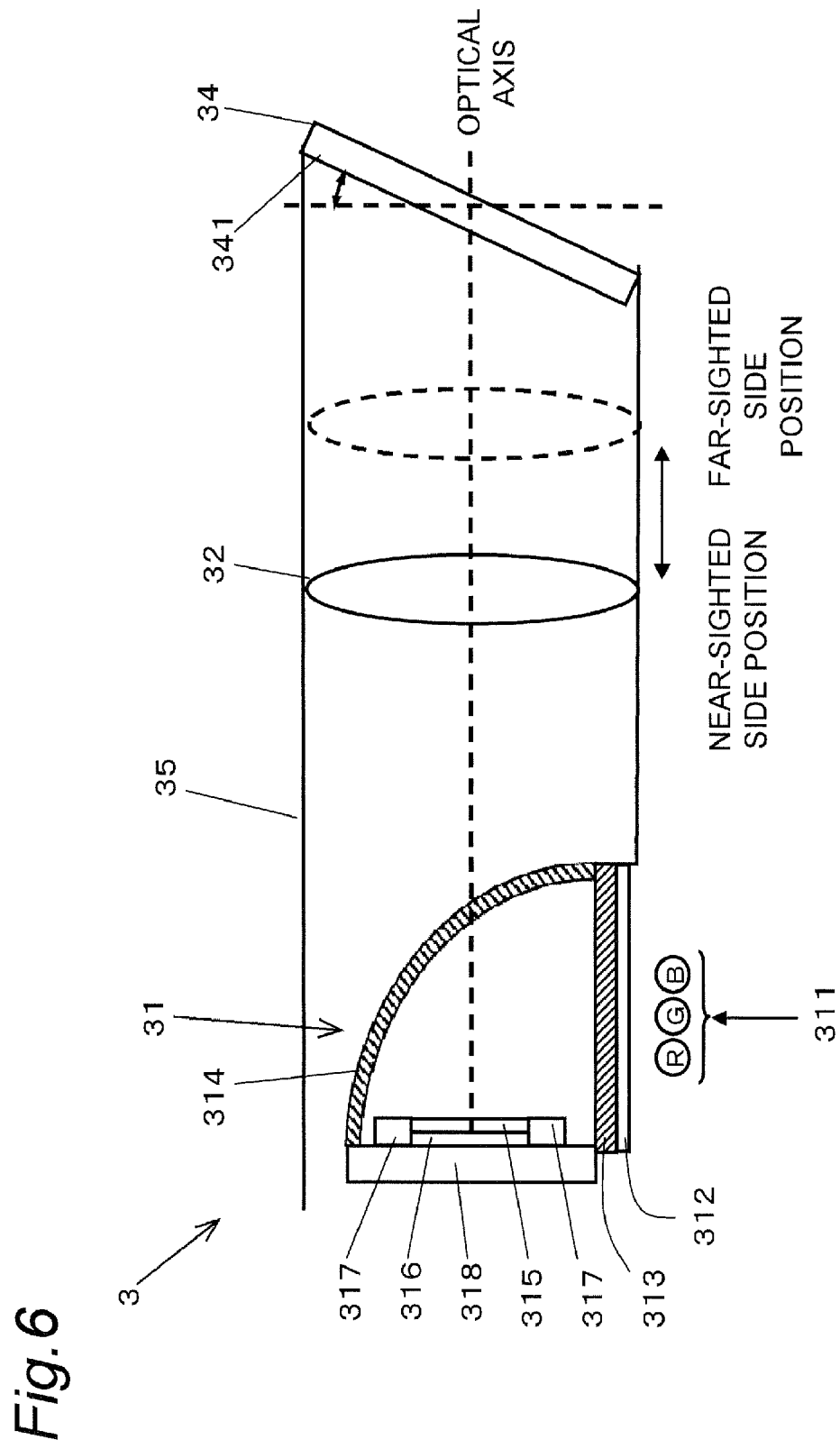

ELECTRONIC VIEWFINDER APPARATUS AND IMAGING APPARATUS

TECHNICAL FIELD

The present invention relates to an electronic viewfinder apparatus and an imaging apparatus including a reflective type liquid crystal display.

BACKGROUND ART

Patent Document 1 discloses an electronic viewfinder apparatus using a reflective type liquid crystal. The electronic viewfinder has a reflective type display means, an illuminating means for illuminating the display means, an optical path dividing means for reflection light from the illuminating means to guide the light to the display means and allowing reflected light from the display means to pass therethrough, and an eyepiece optical system that guides light from the display means, passing through the optical path dividing means, to an observer's eye.

PRIOR ART DOCUMENTS

Patent Documents
Patent Document 1: JP-A-2003-204455

DISCLOSURE OF INVENTION

Problems to be Solved by the Invention

Meanwhile, in an electronic viewfinder including a reflective type liquid crystal display, generally, a cover member (transmission plate) is provided at an eyepiece portion. The cover member is provided so as to be perpendicular to an optical axis of a finder optical system.

However, in the case of such a structure, there is a possibility that light outputted from the reflective type liquid crystal display and entering the transmission plate may be reflected off a transmission plane of the transmission plate and the reflected light may enter the reflective type liquid crystal display. In this case, the entered light may be further reflected by the reflective type liquid crystal display. Thus, when a user views an optical image signal outputted from the reflective type liquid crystal display, a ghost or stray light may appear.

The principle causing this problem will be briefly described using FIGS. 12 and 13. FIG. 12 is a schematic diagram showing the paths of light in the above-described electronic viewfinder. An electronic viewfinder 3 includes a reflective type liquid crystal display 31, a finder optical system 32, and a transmission plate 34. The reflective type liquid crystal display 31 includes a light source 311, a diffuser plate 312, a first polarizing plate 313, a second polarizing plate 314, a liquid crystal display device 315, and a reflecting plate 316. The second polarizing plate 314 is disposed such that a polarization axis thereof is orthogonal to that of the first polarizing plate 313. The liquid crystal display device 315 is formed so as to be aligned in a twisted manner in a state of no voltage being applied thereto.

Next, the paths of light emitted from the light source 311 will be described. Natural light emitted from the light source 311 is diffused by the diffuser plate 312. Of the natural light diffused by the diffuser plate 312, only linear polarization is transmitted through the first polarizing plate 313. The linear polarization transmitted through the first polarizing plate 313 is reflected by the second polarizing plate 314. When the linear polarization reflected by the second polarizing plate 314 passes through the liquid crystal display device 315 to which no voltage is applied, the polarization axis thereof is twisted (turned) 45 degrees. The linear polarization whose polarization axis is twisted 45 degrees is reflected by the reflecting plate 316. When the linear polarization reflected by the reflecting plate 316 passes through the liquid crystal display device 315 again, the polarization axis thereof is twisted 45 degrees. After all, the polarization axis of the linear polarization passing through the liquid crystal display device 315 to which no voltage is applied and reflected is twisted 90 degrees. With this, the linear polarization whose polarization axis is twisted 90 degrees (hereinafter, referred to as inner polarization) is transmitted through the second polarizing plate 314 and outputted from the reflective type liquid crystal display 31 as an optical image signal. On the other hand, when linear polarization reflected by the second polarizing plate 314 passes through the liquid crystal display device 315 to which a voltage is applied, the polarization axis thereof is not twisted. Therefore, linear polarization passing through the liquid crystal display device 315 to which a voltage is applied and reflected is reflected by the second polarizing plate 314.

FIG. 13 shows an example of the paths of light outputted form an upper end of the liquid crystal display device 315. Light outputted from the reflective type liquid crystal display 31 is refracted by the finder optical system 32 and the refracted light enters a transmission plate 34. The transmission plate 34 allows a part of the entered light therethrough and allows a part of the remaining optical image signal to be reflected off a transmission plane 341. The light reflected off the transmission plane 341 of the transmission plate 34 enters the reflective type liquid crystal display 31 through the finder optical system 32. The light entering the reflective type liquid crystal display 31 is inner polarization having a polarization axis that passes through the second polarizing plate 314 and thus passes through the second polarizing plate 314 and enters a plane of the liquid crystal display device 315. The light entered the plane of the liquid crystal display device 315 is transmitted through the liquid crystal display device 315 with its original polarization axis, and is reflected by the reflecting plate 316, when a voltage is applied to the liquid crystal display device 315. Hence, the light reflected by the reflecting plate 316 is transmitted through the second polarizing plate 314 again. Hence, the light passing through the second polarizing plate 314 enters the transmission plate 34 through the finder optical system 32. With this, when the light entered the transmission plate 34 is transmitted therethrough and enters in the user's eye, the light appears as a ghost or flare.

In addition, a part of light reflected off the transmission plane 341 of the transmission plate 34 and passing through the finder optical system 32 may be reflected off a plane of the second polarizing plate 314 on the side of the finder optical system 32 and enter, as indicated by a virtual line, the transmission plate 34 again through the finder optical system 32. With this, when the light entered the transmission plate 34 is transmitted therethrough and enters in the user's eye, the light likewise appears as a ghost or flare.

The present invention is made to solve the above-described problems and an object of the present invention is to provide an electronic viewfinder provided with a reflective type liquid crystal display that can lessen the occurrence of ghosts or stray light caused by reflection off a transmission plane of a transmission plate.

Means for Solving the Problems

The electronic viewfinder apparatus of the present invention includes a reflective type liquid crystal display that outputs an optical image signal a finder optical system that collects the optical image signal outputted from the reflective type liquid crystal display, and a transmission plate that transmits a part of the optical image signal collected by the finder optical system therethrough and reflects at least a part of the remaining optical image signal. The reflective type liquid crystal display includes a light source that emits light, a liquid crystal plate disposed on an optical axis of the finder optical system such that a surface of the liquid crystal plate thereof is perpendicular to the optical axis, a reflecting plate that is disposed on a back side of the liquid crystal plate and on the optical axis of the finder optical system such that a reflection plane of the reflecting plate is perpendicular to the optical axis, and that reflects light entered from the light source through the liquid crystal plate, and a polarizing plate that is disposed to be inclined so as not to be perpendicular to the optical axis of the finder optical system, and polarizing plate reflecting light emitted from the light source toward a side of the reflecting plate and allows the light passing through the liquid crystal plate and reflected by the reflecting plate to pass therethrough toward a side of the finder optical system as an optical image signal, and the transmission plate is disposed to be inclined in a direction opposite to a inclined direction of the polarizing plate such that a transmission plane thereof is not perpendicular to the optical axis of the finder optical system.

In addition, the present invention is directed to an imaging apparatus including an electronic viewfinder apparatus. The electronic viewfinder apparatus of the imaging apparatus includes a reflective type liquid crystal display that outputs an optical image signal a finder optical system that collects the optical image signal outputted from the reflective type liquid crystal display, and a transmission plate that transmits a part of the optical image signal collected by the finder optical system therethrough and reflects at least a part of the remaining optical image signal. The reflective type liquid crystal display includes a light source that emits light, a liquid crystal plate disposed on an optical axis of the finder optical system such that a surface of the liquid crystal plate thereof is perpendicular to the optical axis, a reflecting plate that is disposed on a back side of the liquid crystal plate and on the optical axis of the finder optical system such that a reflection plane of the reflecting plate is perpendicular to the optical axis, and that reflects light entered from the light source through the liquid crystal plate, and a polarizing plate that is disposed to be inclined so as not to be perpendicular to the optical axis of the finder optical system, and polarizing plate reflecting light emitted from the light source toward a side of the reflecting plate and allows the light passing through the liquid crystal plate and reflected by the reflecting plate to pass therethrough toward a side of the finder optical system as an optical image signal, and the transmission plate is disposed to be inclined in a direction opposite to a inclined direction of the polarizing plate such that a transmission plane thereof is not perpendicular to the optical axis of the finder optical system.

Effect of the Invention

According to the present invention, the transmission plane of the transmission plate is disposed to be inclined so as not to be perpendicular to the optical axis of the finder optical system. With this configuration, an optical image signal reflected off the transmission plane is even less likely to enter the reflecting plate through the finder optical system. Thus, in an electronic viewfinder apparatus provided with a reflective type liquid crystal display, the occurrence of ghosts or stray light can be lessened.

In addition, the transmission plate is disposed to be inclined in the direction opposite to the inclined direction of the polarizing plate. In other words, the polarizing plate is disposed to be inclined in the direction opposite to the inclined direction of the transmission plate. Therefore, even when an optical image signal reflected off the transmission plane enters the polarizing plate through the finder optical system, the entered light ray is even less likely to return in the direction of the transmission plate through the finder optical system. With this configuration, in an electronic viewfinder apparatus provided with a reflective type liquid crystal display, occurrence of ghosts or stray light can be further lessened.

BRIEF DESCRIPTION OF DRAWINGS

FIG. 6 is a schematic diagram for describing an A-A cross section of the electronic viewfinder in FIG. 4.

BEST MODE FOR CARRYING OUT THE INVENTION

An embodiment of the present invention will be described below with reference to the drawings. An example in which the present invention is applied to a camera system will be described.

First Embodiment

1. Overview of a Camera System

Figure 1:
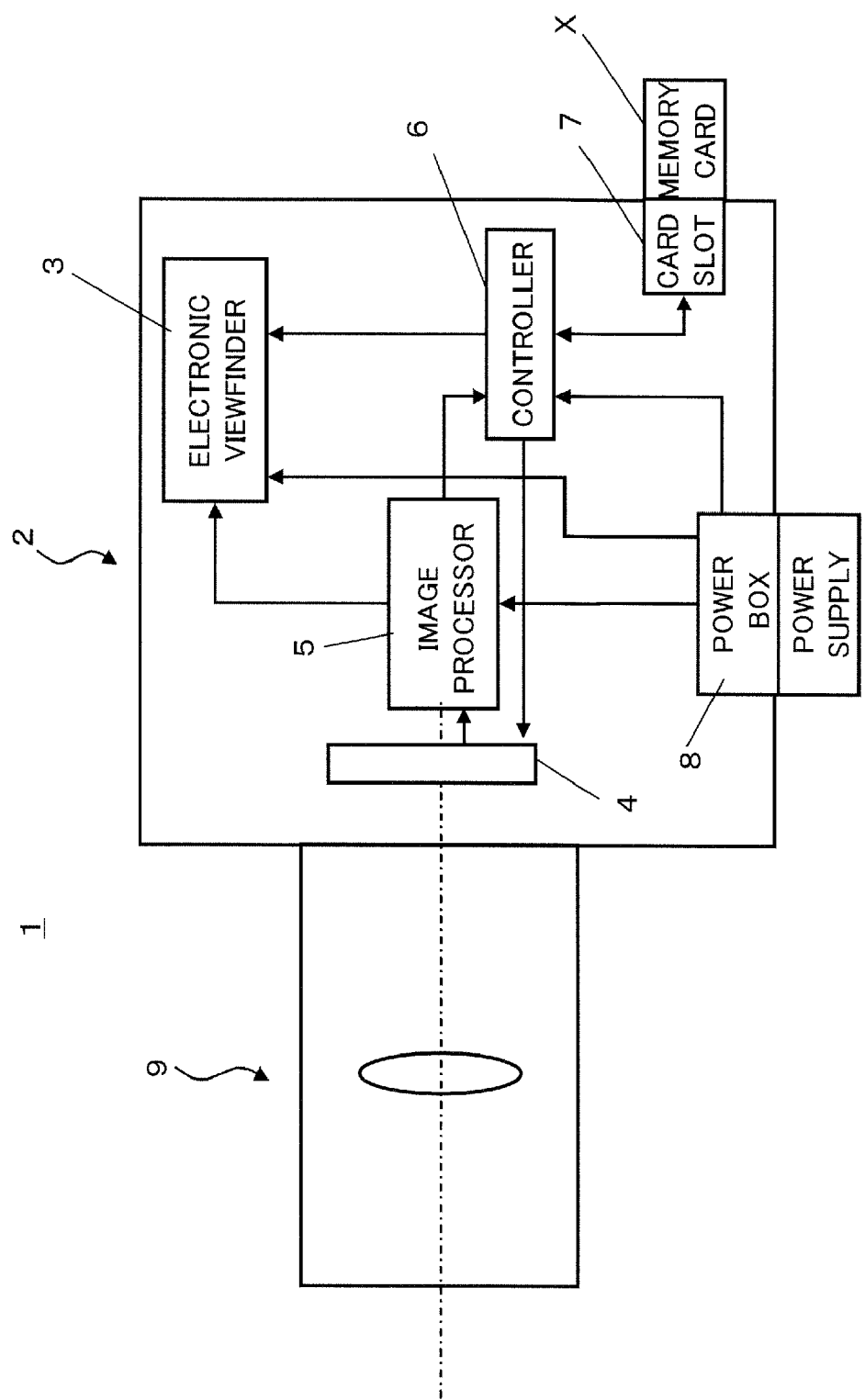
FIG. 1 is a block diagram showing an overview of an exemplary configuration of a camera system according to an embodiment of the present invention.

A camera system 1 includes, as shown in FIG. 1, a camera body 2 and an interchangeable lens 9 which is detachable from the camera body 2. The camera body 2 includes an electronic viewfinder 3, a CMOS image sensor 4, an image processor 5, a controller 6, a card slot 7, and a power box 8. With this, the camera body 2 can display on the electronic viewfinder 3 image data which is captured and generated by the CMOS image sensor 4. Further, the camera body 2 can display on the electronic viewfinder 3 image data stored in a memory card X which is inserted into the card slot 7.

Specifically, the CMOS image sensor 4 converts an optical signal collected by the interchangeable lens 9 into image data. Then, the image processor 5 performs predetermined image processing on the image data converted by the CMOS image sensor 4. The predetermined image processing may include YC conversion, an electronic zoom process, a compression process, and so on, but is not limited thereto. The image processor 5 outputs the image data having been subjected to image processing, to the electronic viewfinder 3. With this, image data which is captured and generated by the CMOS image sensor 4 can be displayed on the electronic viewfinder 3. The controller 6 reads image data stored in the memory card X which is inserted into the card slot 7 and outputs the image data to the electronic viewfinder 3. With this, image data stored in the memory card X can be displayed on the electronic viewfinder 3.

2. Configuration of the Electronic Viewfinder

Figure 2:
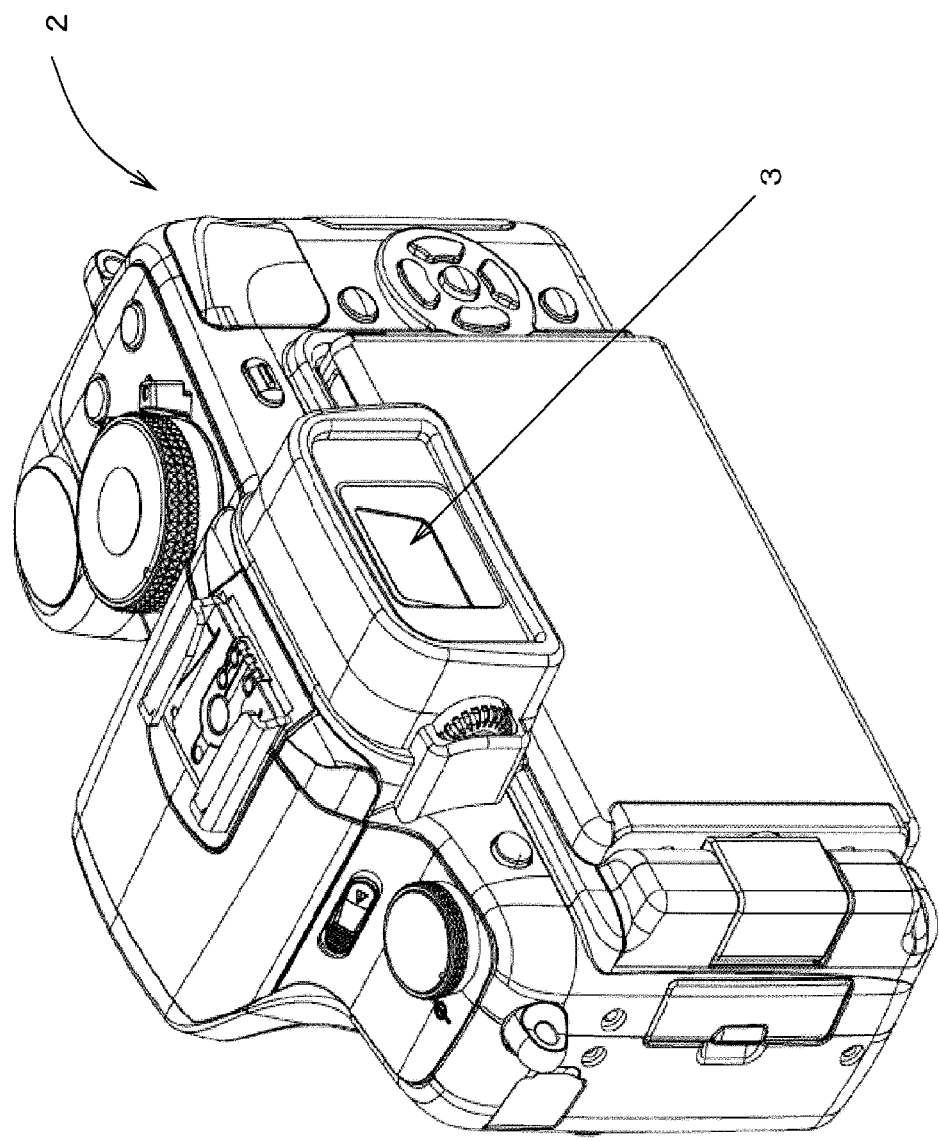
FIG. 2 is a perspective view of a camera body according to the embodiment of the present invention.
Figure 3:
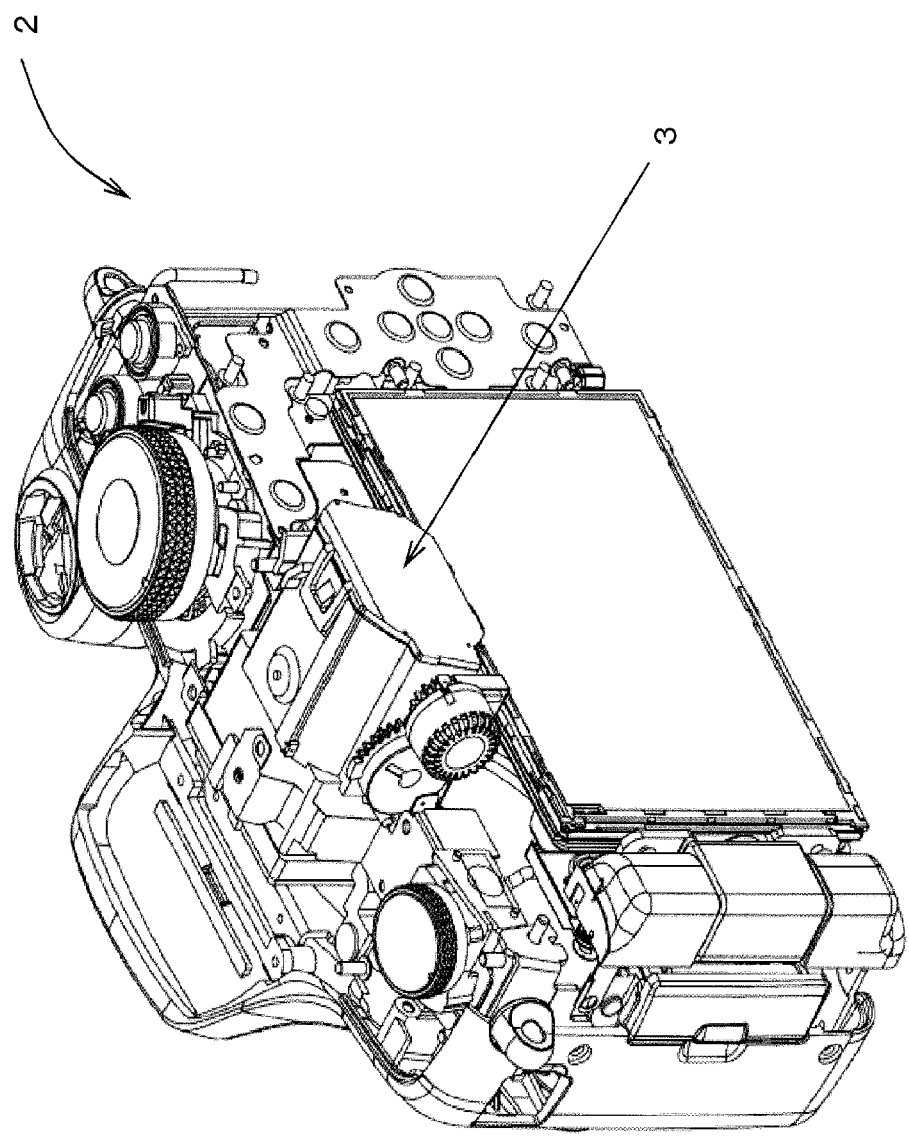
FIG. 3 is a perspective view of the camera body where an upper member of an outer case is removed, according to the embodiment of the present invention.
Figure 4:
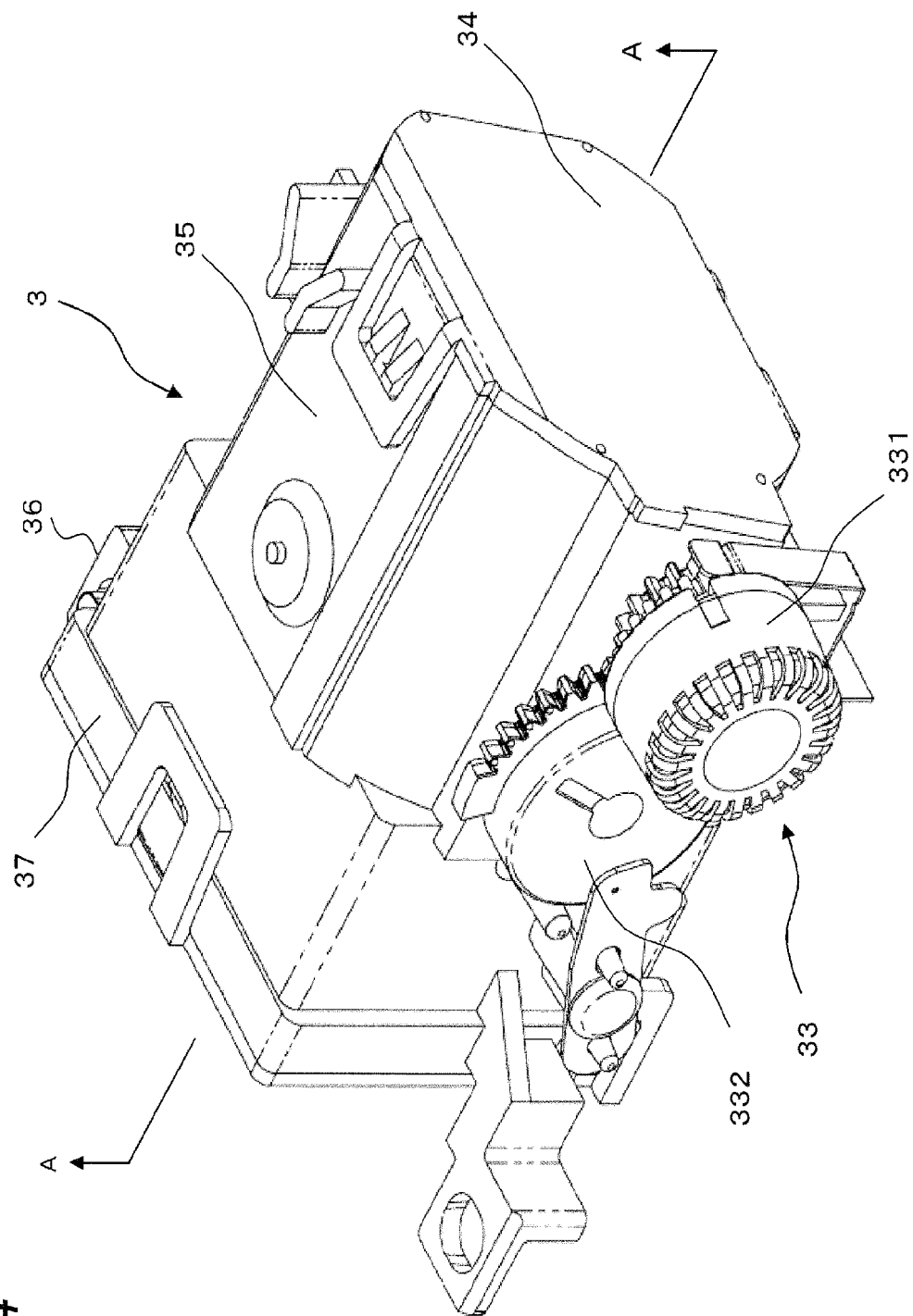
FIG. 4 is a perspective view of an electronic viewfinder according to the embodiment of the present invention.

FIG. 2 is a perspective view of the camera body, FIG. 3 is a perspective view showing a state in which an upper member of an outer case of the camera body is removed, and FIG. 4 is a perspective view of the electronic viewfinder. The electronic viewfinder 3 is fastened, with screws, to a chassis provided to a lower member of the outer case of the camera body 2 with the upper member of the outer case of the camera body 2 being removed. The electronic viewfinder 3 is connected to a board provided thereon the image processor 5 and the controller 6 through a flexible printed wiring board 36. The flexible printed wiring board 36 has signal lines for image data and signal lines for power supply. With this configuration, the electronic viewfinder 3 can accept image data outputted from the image processor 5 or the controller 6. In addition, the electronic viewfinder 3 receives power supply from a battery provided in the power box 8.

Figure 5:
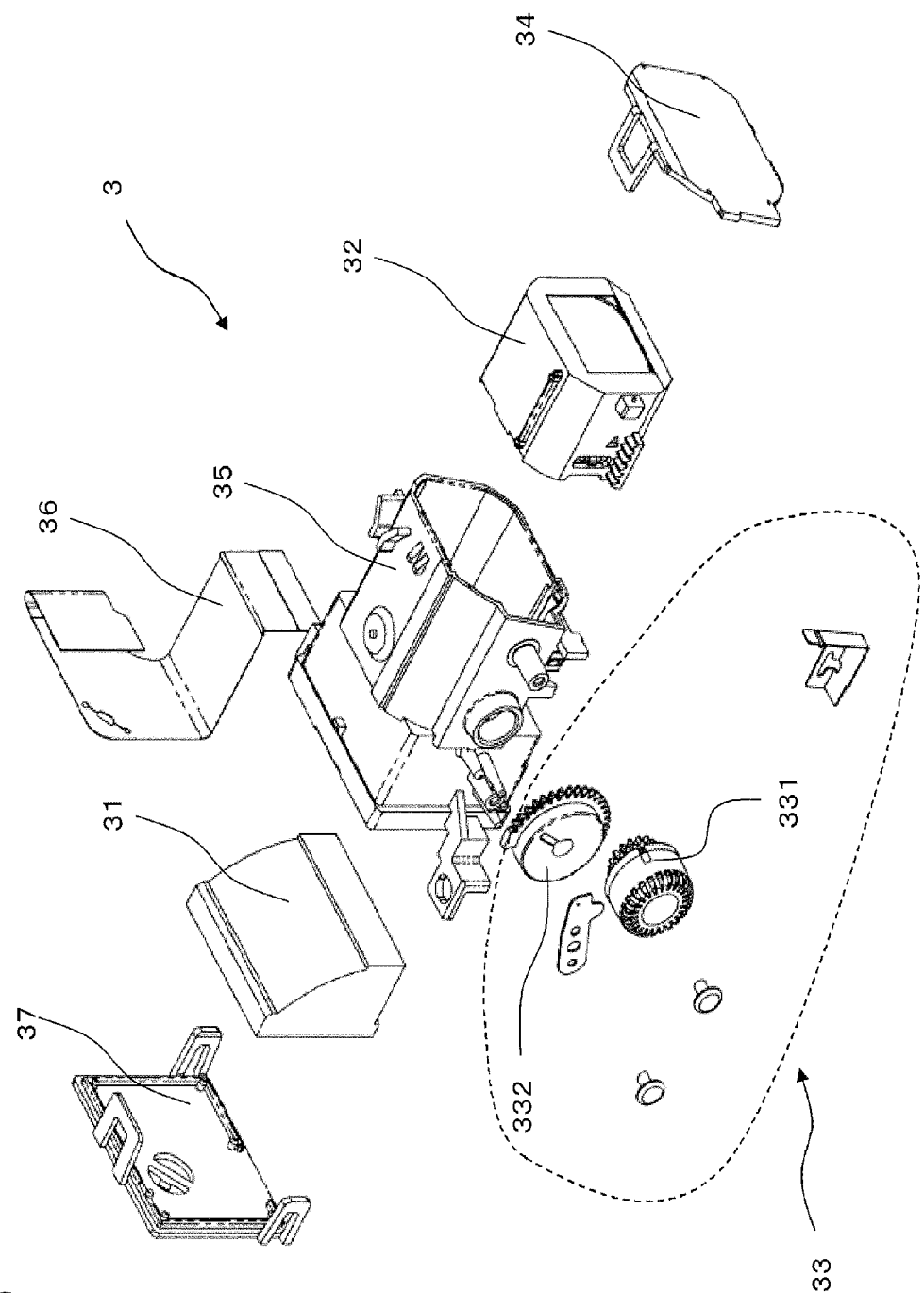
FIG. 5 is an exploded perspective view of the electronic viewfinder according to the embodiment of the present invention.

The electronic viewfinder 3 includes, as shown in FIGS. 4 and 5, a reflective type liquid crystal display 31, a finder optical system 32, a diopter adjustment mechanism 33, a transmission plate 34, a finder unit casing 35, the flexible printed wiring board 36, and a back case 37.

The reflective type liquid crystal display 31 can output image data received from the image processor 5 or the controller 6, as an optical image signal. The reflective type liquid crystal display 31 includes, as shown in FIG. 6, a light source 311, a diffuser plate 312, a first polarizing plate 313, a second polarizing plate 314, a liquid crystal display device 315, a reflecting plate 316, an antireflective mask 317, and a liquid crystal display driver 318. The second polarizing plate 314, the liquid crystal display device 315, the reflecting plate 316, the antireflective mask 317, the liquid crystal display driver 318, and the transmission plate 34 are disposed on an optical axis of the finder optical system 32. Operations performed when the reflective type liquid crystal display 31 outputs image data as an optical image signal are as described in the section describing the problems.

Note that each unit of the reflective type liquid crystal display 31 can be implemented as follows. The light source 311 can be implemented by a three-color LED light source. The light source 311 is disposed on a side of the optical axis of the finder optical system 32. The diffuser plate 312 can be made of a diffusing sheet. The first polarizing plate 313 and the second polarizing plate 314 can be implemented by PBSs (Polarizing Beam Splitters). The reflecting plate 316 can be made of a silicon wafer. The antireflective mask 317 is a member that can prevent reflection. The antireflective mask 317 is provided with an antireflection coating so that light can be absorbed. For a paint, for example, an epoxy-based black paint, an acrylic-based black paint, and so on, can be used. The liquid crystal display driver 318 is a board that has, on the back thereof, a connector which is connected to the flexible printed wiring board 36 and that drives the reflective type liquid crystal display 31. The back case 37 is configured such that it can engage with the finder unit casing 35 with the flexible printed wiring board 36 being connected to the connector.

The finder optical system 32 includes three lenses. The finder optical system 32 collects an optical image signal outputted from the reflective type liquid crystal display 31. FIG. 6 is a schematic diagram for describing an A-A cross section of the electronic viewfinder 3 in FIG. 4. FIG. 6 shows the electronic viewfinder 3 in an orientation for the case of being attached to the camera system 1. The up and down direction and the upper side in FIG. 6 correspond to the up and down direction and the upper side of the camera system 1. The finder optical system 32 is supported by the finder unit casing 35 so as to be movable in an optical axis direction between a near-sighted side position and a far-sighted side position. The finder optical system 32 is moved by the diopter adjustment mechanism 33. The diopter adjustment mechanism 33 is implemented by mechanical members (a knob 331 and a gear 332). A user can move the position of the finder optical system 32 by operating the knob 331 so that the user can view an optical image signal from the reflective type liquid crystal display 31 better.

The transmission plate 34 is configured by glass, plastic, and so on, and is attached to the finder unit casing 35. The transmission plate 34 is configured by a plane-parallel plate. That is, the transmission plate 34 has two parallel planes. One plane serves as a transmission plane 341. Note that in the present embodiment the transmission plate 34 is configured to have two parallel planes. With this configuration, light transmitted through the transmission plate is less likely to cause aberration.

Also, the transmission plate 34 transmits a part of an optical image signal collected by the finder optical system 32 therethrough. A part of the remaining optical image signal is reflected off the transmission plane 341. In order to prevent an optical image signal reflected off the transmission plane from entering the reflecting plate 316 of the reflective type liquid crystal display 31 through the finder optical system 32, the transmission plate 34 is provided to be inclined such that the transmission plane 341 is not perpendicular to the optical axis of the finder optical system 32. Specifically, in the present embodiment, the second polarizing plate 314 is disposed to be inclined such that a lower end thereof is closer to the finder optical system 32 than an upper end thereof in the optical axis direction, and the transmission plate 34 is disposed to be inclined a predetermined angle with a left and right direction of the transmission plane 341 being an axis, such that a lower end of the transmission plane 341 is closer to the finder optical system 32 than an upper end thereof in the optical axis direction. As such, the transmission plate 34 is disposed to be inclined in a direction opposite to a inclined direction of the second polarizing plate 314 such that the transmission plane 341 is not perpendicular to the optical axis of the finder optical system 32.

Note that in the present embodiment the transmission plate 34 is configured such that the transmission plane 341 is not perpendicular to the optical axis of the finder optical system 32 and the transmission plane 341 is inclined in the direction opposite to the inclined direction of the second polarizing plate 314. With this configuration, the transmission plane 341 is not perpendicular to the optical axis of the finder optical system 32, and thus an optical image signal reflected off the transmission plane 341 is even less likely to enter the reflecting plate 316 through the finder optical system 32. In addition, since the transmission plane 341 is inclined in the direction opposite to the inclined direction of the second polarizing plate 314, the likelihood can be lessened that light reflected off the transmission plane 341 enters the second polarizing plate 314 and the entered light is reflected by the second polarizing plate 314 and the reflected light enters the transmission plate 34 again.

Namely, in the present embodiment, the transmission plate 34 is configured such that the transmission plane 341 is inclined in the opposite direction to the inclined direction of the second polarizing plate 341 instead of in the same direction. With this configuration, the likelihood can be lessened that a part of an optical image signal from the reflective type liquid crystal display 31 is reflected off the transmission plane 341 of the transmission plate 34 and a part of the reflected light is reflected by the second polarizing plate 314, which leads to the occurrence of ghosts or stray light.

Here, the above-described predetermined angle is set to an angle at which light reflected by the transmission plate 34 does not enter the reflecting plate 316 with the finder optical system 32 being moved to the near-sighted side. Here, with reference to FIG. 7, an example of the steps of adjusting the predetermined angle of the transmission plate 34 will be described.

When, as in the present embodiment, the transmission plate 34 is inclined such that the lower end thereof comes close to the finder optical system 32, there is a need to consider a ghost or stray light that occurs in connection with the relationship between the lower end of the transmission plate 34 and an upper portion of a plane of the liquid crystal display device 315 (i.e., an upper portion of the reflecting plate 316) which is located symmetrically with respect to the optical axis of the lenses.

Figure 7A:
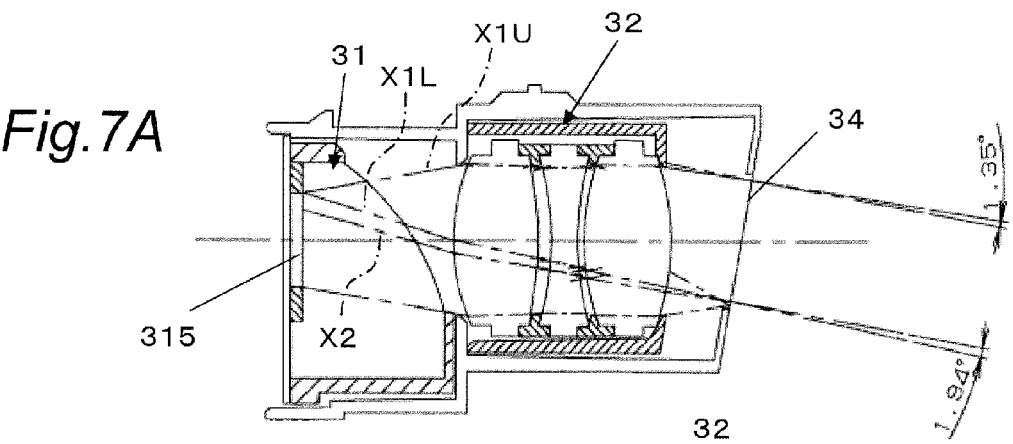
FIGS. 7A to 7C are diagrams for describing an adjustment to the angle of a transmission plate according to the embodiment of the present invention.

The liquid crystal display device 315 emits light at all angles as a point light source. As shown in FIG. 7A, light rays X1U and X1L which are an upper limit and a lower limit of light emitted from the upper portion of the liquid crystal display device 315 are traced. The light rays X1U and X1L of the upper and lower limits are reflected by the transmission plate 34 and are, for example, as indicated by X2, re-projected onto the plane of the liquid crystal display device 315 (video range). In this case, resulting video is observed by the user as a ghost or stray light.

Figure 7B:
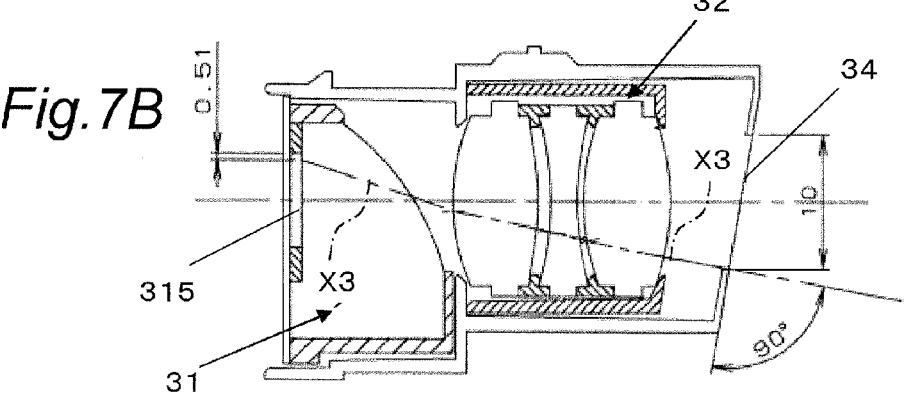

FIG. 7B is a diagram for examining a range in the liquid crystal display device 315 from which output (video output) is reflected by the transmission plate 34 and re-projected onto the plane of the liquid crystal display device 315. First, a light ray X3 is drawn which is orthogonal to the transmission plate 34 at the lower end of the transmission plate 34, i.e., whose incident angle with respect to the transmission plate 34 is 0 degree. Next, a light ray X3' is drawn, which is a result of the light ray being transmitted through the finder optical system 32 and refracted. Then, it is determined which position on the plane of the liquid crystal display device 315 the light ray X3' reaches. The thus determined reaching position on the liquid crystal plane 315 of the light ray X3' is located at a distance of 0.51 mm from an upper end of the plane of the liquid crystal display device 315 (video range). A video output in a range from the 0.51 mm position to the upper end of the plane of the liquid crystal display device 315 enters the transmission plate 34 at an incident angle of 0 degree or more and a part of the entered light is reflected downward by the transmission plate 34 and the reflected light is re-projected onto the plane of the liquid crystal display device 315, causing a ghost or stray light.

Figure 7C:
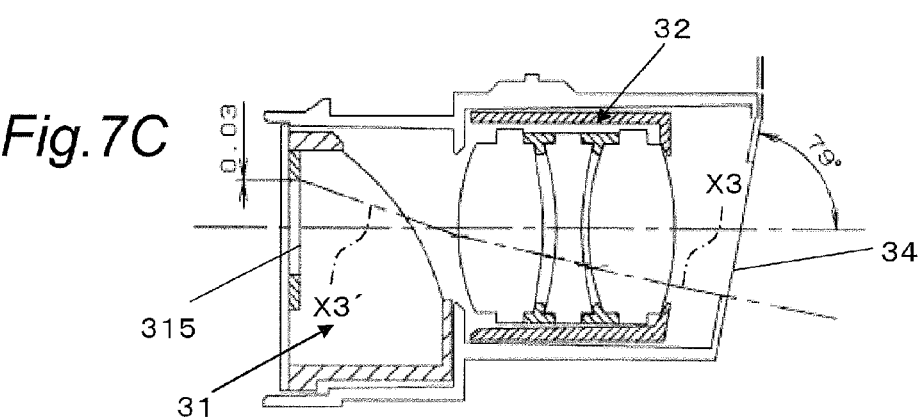

FIG. 7C is a diagram for describing the case in which the tilt angle of the transmission plane 341 is adjusted so as to prevent the reflection from occurring. In FIG. 7C, light rays are drawn by the same method as that in the case of FIG. 7B. In FIG. 7C, the predetermined angle of the transmission plate 34 is adjusted such that the light ray X3' reaches a position off the plane of the liquid crystal display device 315 (video range). That is, with this configuration, reflected light from the transmission plate 34 is projected to a position off the plane of the liquid crystal display device 315. This indicates that all of those lights (videos) outputted form the plane of the liquid crystal display device 315 enter the lower side of the transmission plane 341 at an incident angle of 0 degree or more, and reflected light from the transmission plane 341 is projected to a position above the plane of the liquid crystal display device 315. With this configuration, all of those videos that are outputted from the liquid crystal plane do not return to the liquid crystal plane by reflection by the transmission plate 34, and thus, the occurrence of ghosts or stray light can be lessened.

With a method such as that described above, the angle of the transmission plate 34 can be adjusted.

Note that the finder unit casing 35 is provided with an antireflection coating so that light entered an interior thereof can be absorbed. For a paint, for example, an epoxy-based black paint, an acrylic-based black paint, and so on, can be used. With this configuration, the occurrence of ghosts or stray light due to reflection off the interior of the finder unit casing 35 is lessened. Note that the configuration is not limited thereto and the interior of the finder unit casing 35 may be subjected to a surface treatment to diffuse light entered the interior of the casing 35.

3. Paths of Light Outputted from the Reflective Type Liquid Crystal Display

Figure 8:
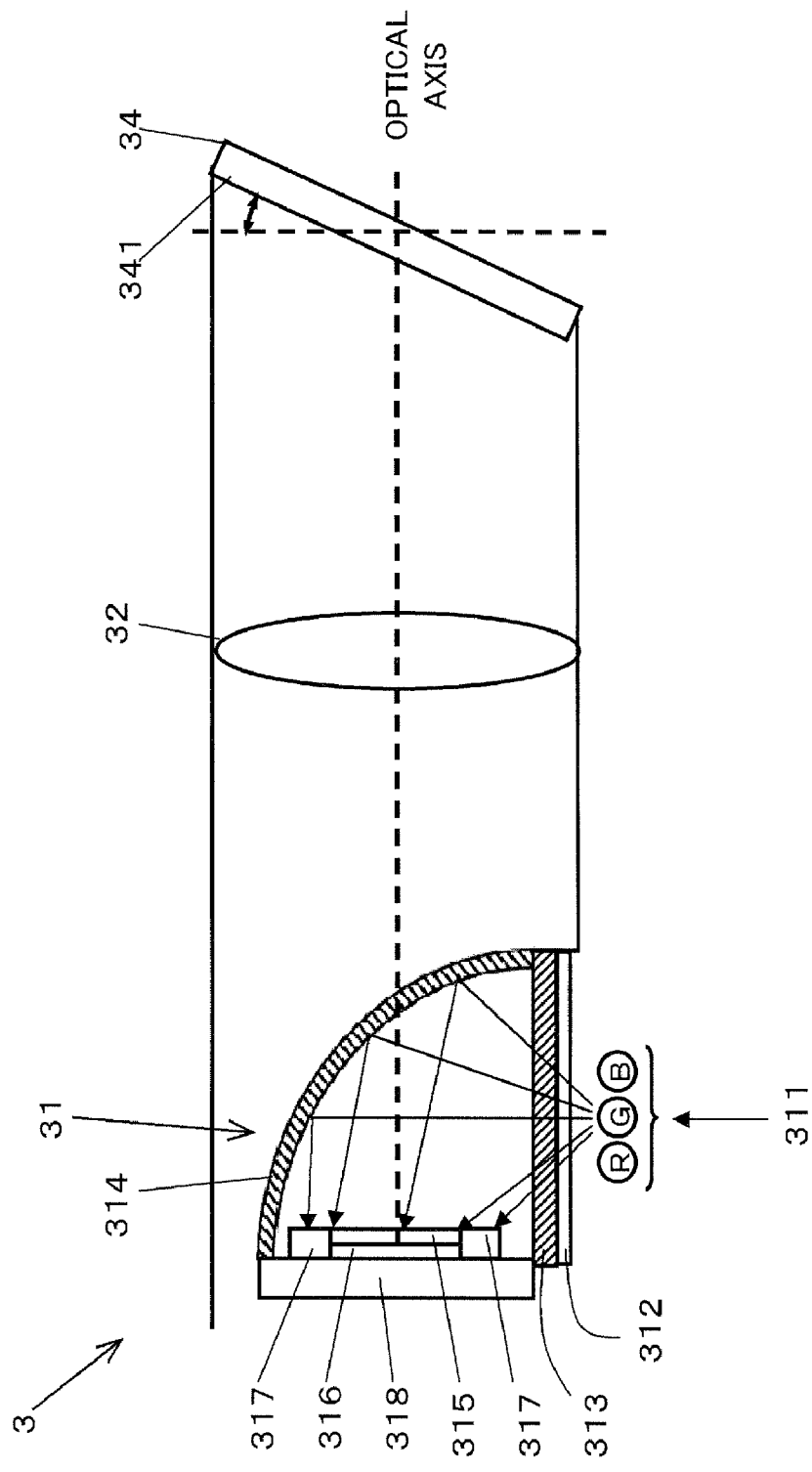
FIG. 8 is a schematic diagram for describing paths of light in the electronic viewfinder according to the embodiment of the present invention.

Paths of light in the electronic viewfinder 3 which is configured in the above-described manner will be described using FIG. 8. FIG. 8 is a schematic diagram for describing paths of light in the electronic viewfinder 3.

Light emitted from the light source 311 is diffused by the diffuser plate 312. Of the light diffused by the diffuser plate 312, only linear polarization is transmitted through the first polarizing plate 313. The linear polarization transmitted through the first polarizing plate 313 is reflected by the second polarizing plate 314. When the linear polarization reflected by the second polarizing plate 314 is transmitted through the liquid crystal display device 315 to which no voltage is applied, the polarization axis thereof is twisted 45 degrees. The linear polarization whose polarization axis is twisted 45 degrees is reflected by the reflecting plate 316. When the linear polarization reflected by the reflecting plate 316 passes through the liquid crystal display device 315 again, the polarization axis thereof is twisted 45 degrees. After all, the polarization axis of the linear polarization passing through the liquid crystal display device 315 to which no voltage is applied and reflected is twisted 90 degrees. Namely, light reflected by the reflecting plate 316 is twisted to a predetermined polarization state that allows the reflected light to be transmitted through the second polarizing plate 314. With this configuration, linear polarization which is twisted to the predetermined polarization state (hereinafter, referred to as inner polarization) is transmitted through the second polarizing plate 314 and outputted from the reflective type liquid crystal display 31 as an optical image signal. On the other hand, when linear polarization reflected by the second polarizing plate 314 passes through the liquid crystal display device 315 to which a voltage is applied, the polarization axis thereof is not twisted. Therefore, linear polarization passing through the liquid crystal display device 315 to which a voltage is applied and reflected is reflected by the second polarizing plate 314.

Figure 9:
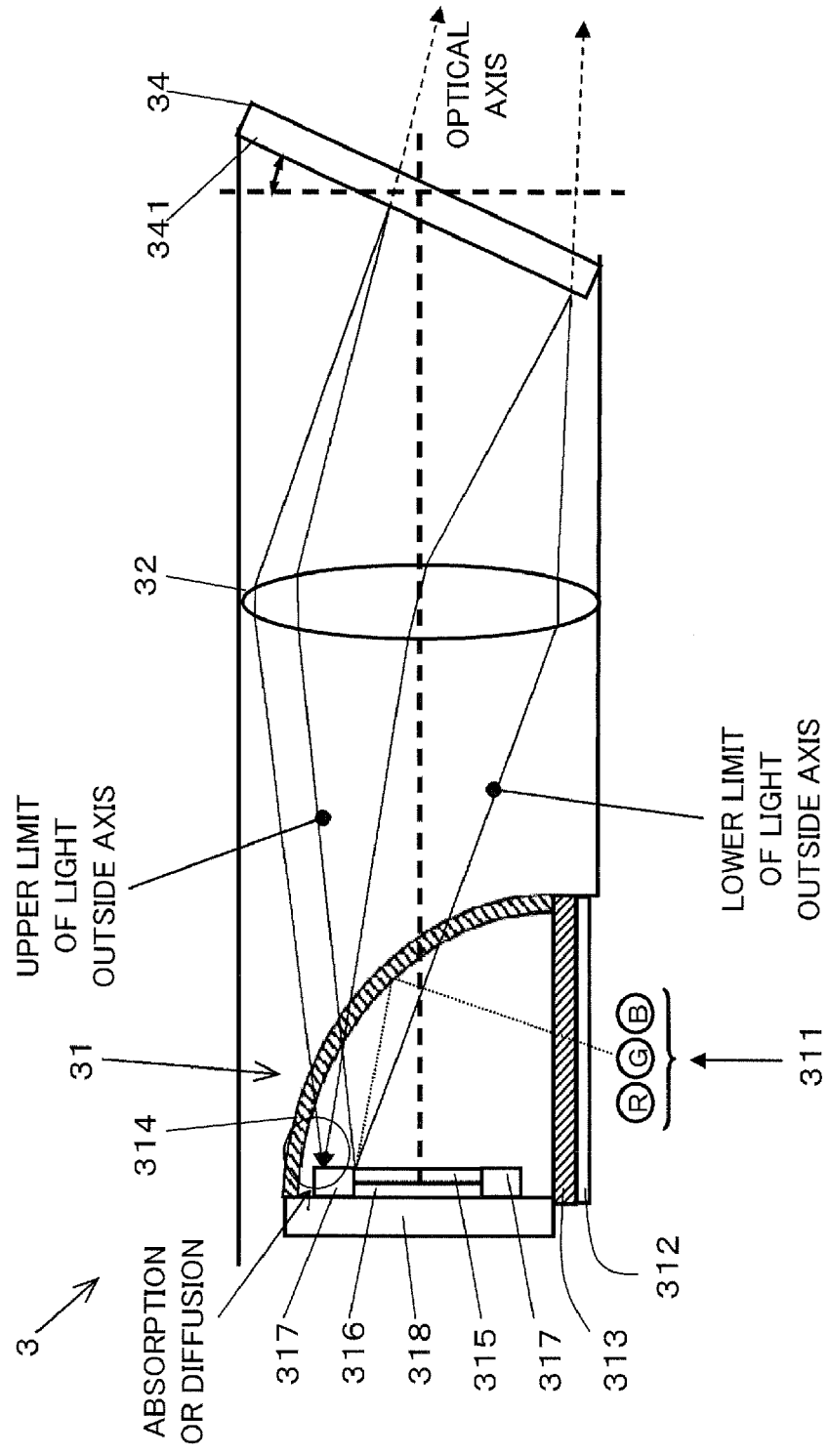
FIG. 9 is a schematic diagram for describing paths of light in the electronic viewfinder according to the embodiment of the present invention.
Figure 10:
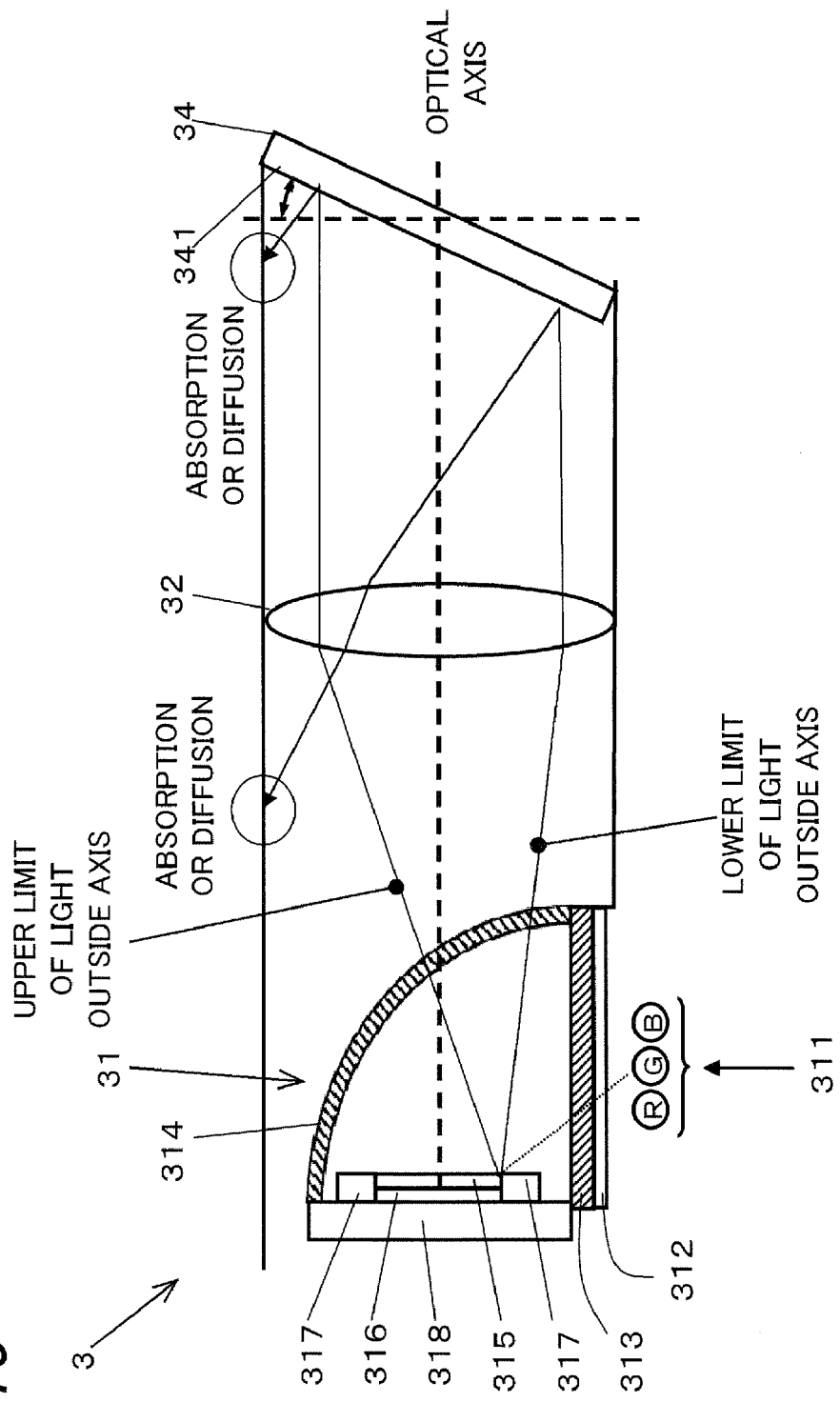
FIG. 10 is a schematic diagram for describing paths of light in the electronic viewfinder according to the embodiment of the present invention.

Light outputted from the reflective type liquid crystal display 31 is refracted by the finder optical system 32 and the refracted light enters the transmission plate 34. At that time, as shown in FIG. 9 as an example, a part of light outputted from an upper end of the liquid crystal display device 315 and entering the transmission plate 34 is transmitted through the transmission plate 34 and a part of the remaining optical image signal is reflected off the transmission plane 341. The light reflected off the transmission plane 341 of the transmission plate 34 is inner polarization having a polarization axis that passes through the second polarizing plate 314. Thus, after the light has passed through the finder optical system 32, the light passes through the second polarizing plate 314 but, in the present embodiment, enters a position off the plane of the liquid crystal display device 315. The light entered the position off the liquid crystal display device 315 is absorbed by the antireflective mask 317. On the other hand, as shown in FIG. 10 as an example, when light outputted from a lower end of the liquid crystal display device 315 is reflected off the transmission plane 341 of the transmission plate 34, the reflected light enters the interior of the finder unit casing 35 and then is absorbed.

4. Term Correspondence

The electronic viewfinder 3 is an example of an electronic viewfinder apparatus. The reflective type liquid crystal display 31 is an example of a reflective type liquid crystal display. The light source 311 is an example of a light source. The liquid crystal display device 315 is an example of a liquid crystal plate. The reflecting plate 316 is an example of a reflecting plate. The finder optical system 32 is an example of a finder optical system. The second polarizing plate 314 is an example of a polarizing plate. The transmission plate 34 is an example of a transmission plate.

The predetermined angle at which the transmission plate 34 is inclined is an angle at which all of those lights (videos) outputted from the liquid crystal plane enter positions lower than the position where the incident angle is 0 degree. In other words, it is an angle at which all of those videos outputted from the liquid crystal plane do not return to the liquid crystal plane by reflection by the transmission plate 34.

5. Summary

The electronic viewfinder 3 of the present embodiment includes the reflective type liquid crystal display 31 that outputs an optical image signal, the finder optical system 32 that collects the optical image signal outputted from the reflective type liquid crystal display 31; and the transmission plate 34 that transmits a part of the optical image signal collected by the finder optical system 32 therethrough and reflects at least a part of the remaining optical image signal. The reflective type liquid crystal display 31 includes the light source 311 that emits light from a side of an optical axis of the finder optical system 32 in a direction orthogonal to the optical axis; the liquid crystal display device 315 disposed on the optical axis of the finder optical system 32 such that a surface of the liquid crystal display device 315 is perpendicular to the optical axis; the reflecting plate 316 that is disposed on the back side of the liquid crystal display device 315 and on the optical axis of the finder optical system 32 such that a reflection plane of the reflecting plate 316 is perpendicular to the optical axis; and the second polarizing plate 314. The second polarizing plate 314 is disposed on the optical axis of the finder optical system 316, to be inclined so as not to be perpendicular to the optical axis, and reflects light emitted from the light source 311 toward the side of the reflecting plate 316 and allows an optical image signal passing through the liquid crystal display device 315 and reflected by the reflecting plate 316 in an optical axis direction to pass therethrough toward the side of the finder optical system 32. The transmission plate 34 is disposed to be inclined a predetermined angle in a direction opposite to a inclined direction of the second polarizing plate 314 such that the transmission plane 341 is not perpendicular to the optical axis of the finder optical system 32.

With this configuration, in the electronic viewfinder 3, an optical image signal reflected off the transmission plane 341 can be prevented from entering the reflecting plate 316 through the finder optical system 32. That is, in the electronic viewfinder 3 provided with the reflective type liquid crystal display 31, the occurrence of ghosts or stray light can be lessened.

In addition, the transmission plate 34 is disposed to be inclined in the direction opposite to the inclined direction of the second polarizing plate 314. In other words, the second polarizing plate 314 is disposed to be inclined in the direction opposite to the inclined direction of the transmission plate 34. Therefore, even when an optical image signal reflected off the transmission plane 341 enters the second polarizing plate 314 through the finder optical system 32, the likelihood of the entered light ray returning in the direction of the transmission plate 34 through the finder optical system 32 is lessened. With this configuration, in the electronic viewfinder 3 provided with the reflective type liquid crystal display 31, the occurrence of ghosts or stray light can be further lessened.

In addition, the transmission plate 34 is disposed to be inclined such that the lower end of the transmission plane 341 is closer to the finder optical system 32 than the upper end thereof in the optical axis direction. With this configuration, the transmission plane 341 faces downward in the case of viewing from the user side. Hence, the likelihood can be lessened that extraneous light such as sunlight which enters from above is reflected by the transmission plate 34 and the reflected light enters the user's eye. That is, when the user performs shooting in general holding style (when shooting is performed with the optical axis of the finder optical system 32 being substantially horizontal), if sunlight enters the transmission plate 34 from above the exterior of the camera system 1, then a part of the light entered the transmission plate 34 is reflected. However, by inclining the transmission plate 34 in the above-described manner, light entered from above and reflected goes obliquely downward in a direction going away from the optical axis. With this configuration, the likelihood of display on the reflective type liquid crystal display 31 becoming difficult to see when the user performs shooting can be lessened.

In addition, in the electronic viewfinder 3 of the present embodiment, the light source 311 is disposed below the optical axis of the finder optical system 32. If the light source 311 is disposed above the optical axis, then the light source 311 protrudes above the finder optical system 32. However, in the present embodiment, since the light source 311 is disposed below the optical axis, the light source 311 does not protrude above. Accordingly, the height of the camera body 2 can be suppressed from increasing, enabling to miniaturize the camera body 2.

In addition, when the light source 311 is disposed below the optical axis of the finder optical system 32, if the transmission plate 34 is disposed to be inclined such that the lower end of the transmission plane 341 goes away from the finder optical system 32, then it becomes easier for the user to see an obliquely downward direction relative to the optical axis from the top side of the transmission plate 34. That is, it is easy to see the portion of the light source 311 from the user. However, in the present embodiment, since the transmission plate 34 is disposed to be inclined such that the lower end of the transmission plane 341 comes close to the finder optical system 32, it is difficult to see the portion of the light source 311 from the user.

Other Embodiments

As an embodiment of the present invention, the first embodiment is exemplified. However, the present invention is not limited to the first embodiment and can be implemented in other embodiments, too. Hence, other embodiments of the present invention will be collectively described below.

In the first embodiment, an example case is described in which the present invention is applied to an interchangeable lens type camera system. However, the present invention is not limited thereto and may be applied to an electronic viewfinder which is included in a compact type digital camera.

In the first embodiment, a CMOS image sensor is used as an example of an imaging device. However, the configuration is not limited thereto and a COD image sensor can also be used as an imaging device.

In the first embodiment, as shown FIG. 6, the transmission plate 34 is inclined with the left and right direction of the transmission plane 341 being an axis. However, the configuration is not limited thereto and the transmission plate may be inclined with an up and down direction of the transmission plane being an axis.

In the present embodiment, the transmission plate 34 is provided such that the transmission plane 341 is not perpendicular to the optical axis of the finder optical system 32, to prevent an optical image signal reflected off the transmission plane 341 from entering the reflecting plate through the finder optical system 32. However, the configuration is not limited thereto and the transmission plate 34 may be provided such that the transmission plane 341 is not perpendicular to the optical axis of the finder optical system 32, to lessen the likelihood that an optical image signal reflected off the transmission plane 341 enters the reflecting plate through the finder optical system 32. This can also lessen the occurrence of ghosts or stray light.

Figure 11:
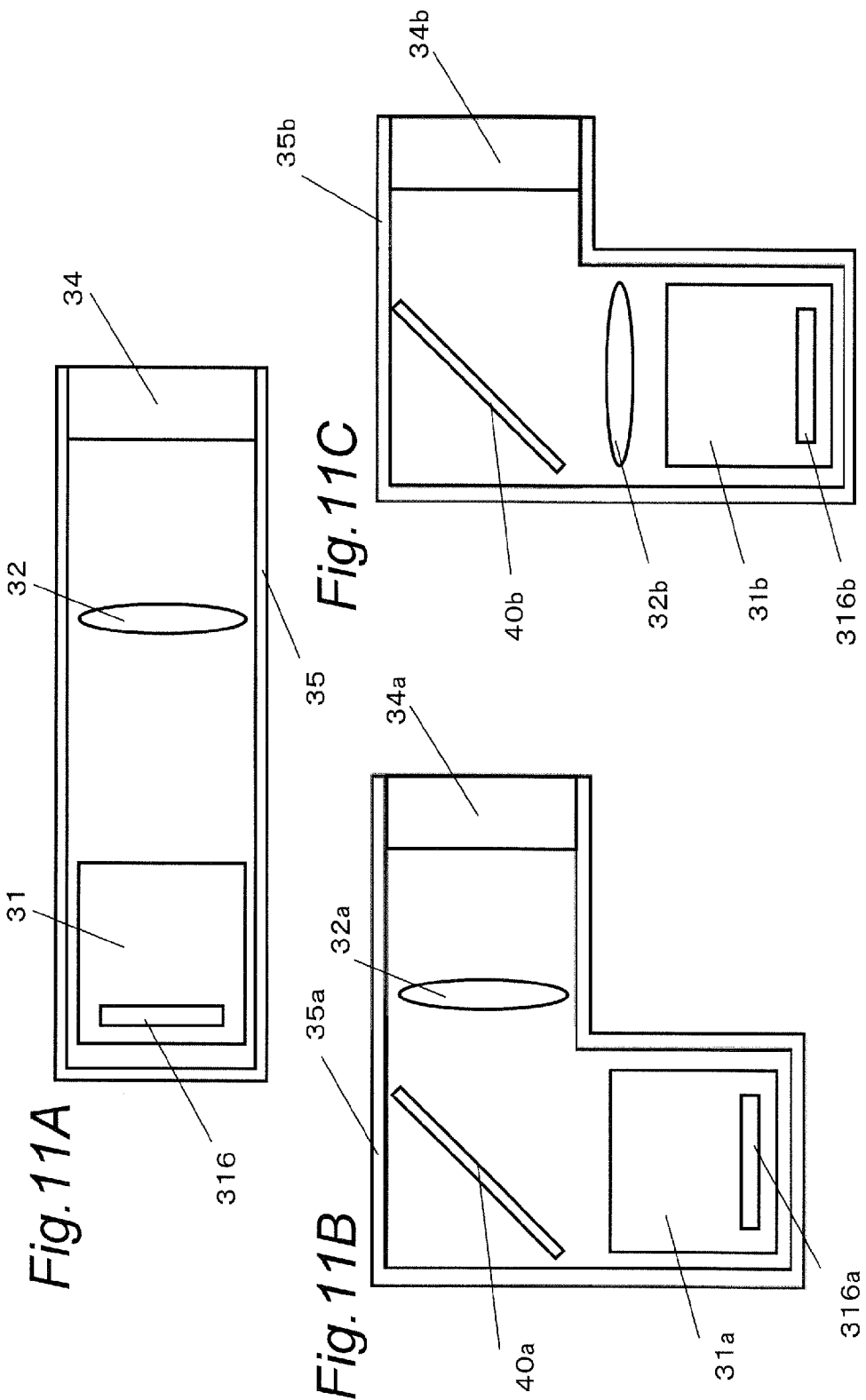
FIGS. 11A to 11C are diagrams for describing exemplary dispositions of each component in the embodiment of the present invention and other embodiments.
Figure 12:
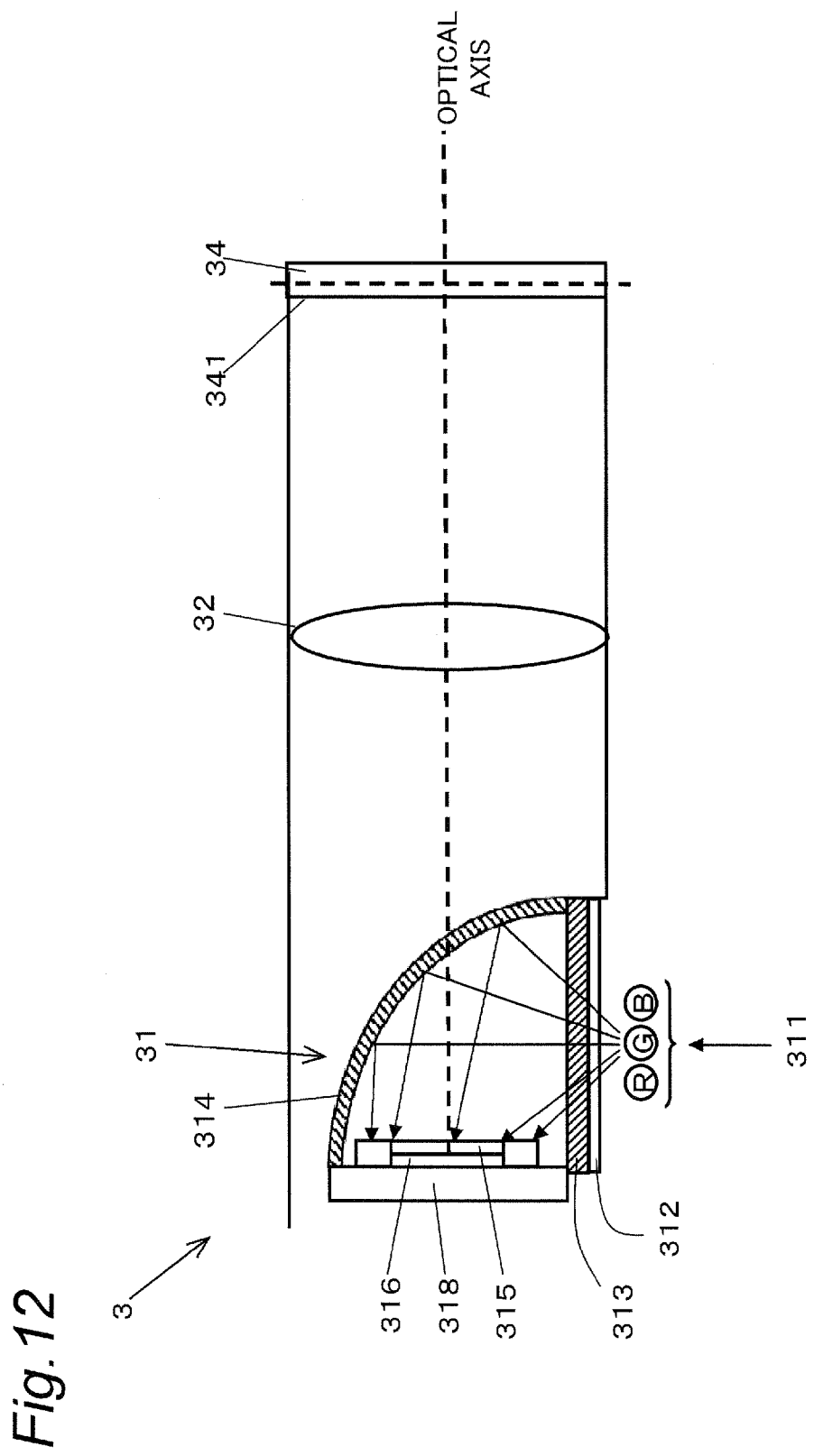
FIG. 12 is a diagram for describing problems dealt with by the present invention.
Figure 13:
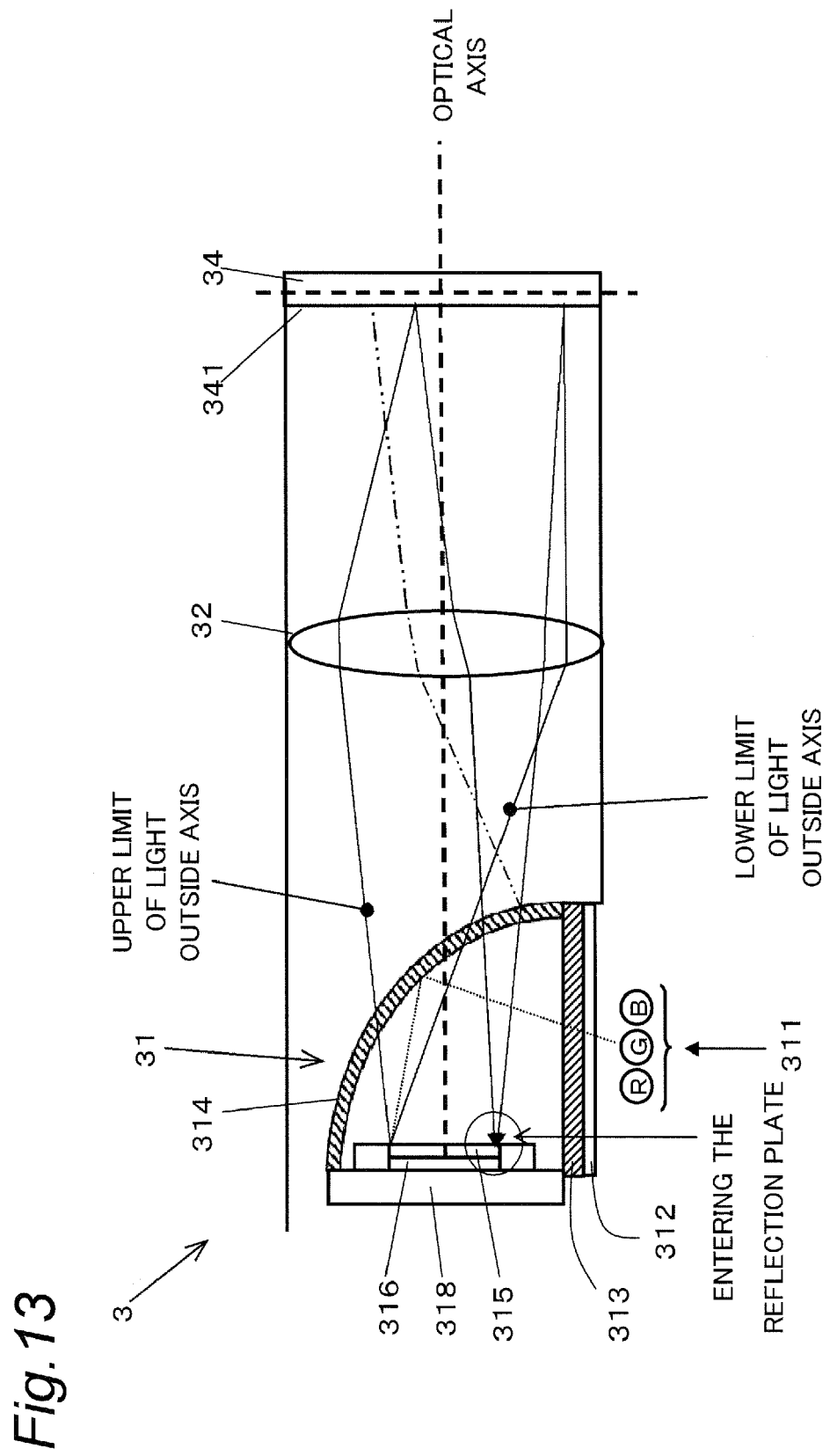
FIG. 13 is a diagram for describing the problems dealt with by the present invention.

FIG. 11 is a diagram showing exemplary dispositions of each component when the electronic viewfinder 3 is seen from the top. As shown in FIG. 11A, in the first embodiment, as shown in FIG. 11A, the reflective type liquid crystal display 31, the finder optical system 32, and the transmission plate 34 are provided in a straight line. However, the configuration is not limited thereto and, as shown in FIG. 11B, an L-shaped disposition may be employed by providing a mirror 40a between a finder optical system 32a and a transmission plate 34a. Alternatively, as shown in FIG. 11C, a mirror 40b may be provided between a reflective type liquid crystal display 31b and a finder optical system 32b.

A reflective type liquid crystal display of the present invention is not limited to the reflective type liquid crystal display 31 of the first embodiment and may have any configuration.

INDUSTRIAL APPLICABILITY

The present invention can be applied to an electronic viewfinder including a reflective type liquid crystal display. For example, the present invention can be applied to an electronic viewfinder to be provided in an imaging apparatus such as a digital camera.

DESCRIPTION OF THE REFERENCE NUMERALS

1: CAMERA SYSTEM
2: CAMERA BODY
3: ELECTRONIC VIEWFINDER
4: CMOS IMAGE SENSOR
5: IMAGE PROCESSOR
6: CONTROLLER
7: CARD SLOT
8: POWER BOX
9: INTERCHANGEABLE LENS
31: REFLECTIVE TYPE LIQUID CRYSTAL DISPLAY
311: LIGHT SOURCE
312: DIFFUSER PLATE
313: FIRST POLARIZING PLATE
314: SECOND POLARIZING PLATE
315: LIQUID CRYSTAL DISPLAY DEVICE
316: REFLECTING PLATE
317: ANTIREFLECTIVE MASK
318: LIQUID CRYSTAL DISPLAY DRIVER
32: FINDER OPTICAL SYSTEM
33: DIOPTER ADJUSTMENT MECHANISM
34: TRANSMISSION PLATE
341: TRANSMISSION PLANE
35: FINDER UNIT CASING
36: FLEXIBLE PRINTED WIRING BOARD
37: BACK CASE

The invention claimed is:
1. An electronic viewfinder apparatus which is provided in an imaging apparatus, comprising:
a reflective type liquid crystal display that outputs an optical image signal;
a finder optical system that collects the optical image signal outputted from the reflective type liquid crystal display; and
a transmission plate that transmits a part of the optical image signal collected by the finder optical system therethrough and reflects at least a part of the remaining optical image signal, wherein
the reflective type liquid crystal display includes:
a light source that emits light;
a liquid crystal plate disposed on an optical axis of the finder optical system such that a surface of the liquid crystal plate thereof is perpendicular to the optical axis;
a reflecting plate that is disposed on a back side of the liquid crystal plate and on the optical axis of the finder optical system such that a reflection plane of the reflecting plate is perpendicular to the optical axis, and that reflects light emitted from the light source through the liquid crystal plate; and
a polarizing plate that is disposed to be inclined so as not to be perpendicular to the optical axis of the finder optical system, the polarizing plate reflecting light emitted from the light source toward a side of the reflecting plate and allows the light passing through the liquid crystal plate and reflected by the reflecting plate to pass therethrough toward a side of the finder optical system as an optical image signal, and
the transmission plate is disposed to be inclined in a direction opposite to an inclined direction of the polarizing plate such that a transmission plane thereof is not perpendicular to the optical axis of the finder optical system.

2. The electronic viewfinder apparatus according to claim 1, wherein when the electronic viewfinder apparatus is included in an imaging apparatus, each of the polarizing plate and the transmission plate is disposed such that one side thereof closer to the finder optical system in an optical axis direction is located lower in an up and down direction of the imaging apparatus than another side thereof farther away from the finder optical system as a result of incline of the polarizing plate and the transmission plate.

3. An imaging apparatus comprising an electronic viewfinder apparatus according to claim 1.

4. The imaging apparatus according to claim 3, wherein each of the polarizing plate and the transmission plate is disposed such that one side thereof closer to the finder optical system in an optical axis direction is located lower in an up and down direction of the imaging apparatus than another side farther away from the finder optical system as a result of incline of the polarizing plate and the transmission plate.

5. An electronic viewfinder apparatus comprising:
a reflective type liquid crystal display operable to output an optical image signal;
a finder optical system operable to collect the optical image signal outputted from the reflective type liquid crystal display; and
a transmission plate operable to transmit a part of the optical image signal collected by the finder optical system and reflect at least a part of the remaining optical image signal collected by the finder optical system, wherein
the reflective type liquid crystal display includes:
a light source operable to emit light;
a liquid crystal device having a surface disposed perpendicular to an optical axis of the finder optical system;
a reflecting plate disposed on a back side of the liquid crystal device such that a reflection plane of the reflecting plate is perpendicular to the optical axis of the finder system, the reflecting plate reflecting light emitted from the light source; and
a polarizing plate disposed to be inclined so as not to be perpendicular to the optical axis of the finder optical system, the polarizing plate reflecting light emitted from the light source toward a side of the reflecting plate and allowing the light passing through the liquid crystal device and reflected by the reflecting plate to pass therethrough toward a side of the finder optical system as an optical image signal;
wherein the transmission plate is disposed to be inclined in a direction opposite to an inclined direction of the polarizing plate such that a transmission plane thereof is not perpendicular to the optical axis of the finder optical system.

6. An imaging apparatus comprising an electronic viewfinder apparatus according to claim 5.

7. The imaging apparatus according to claim 6, wherein each of the polarizing plate and the transmission plate is disposed such that one side thereof closer to the finder optical system in an optical axis direction is located lower in vertical direction of the imaging apparatus than another side thereof farther away from the finder optical system as a result of incline of the polarizing plate and the transmission plate.

8. A digital camera comprising an electronic viewfinder apparatus according to claim 5.

* * * * *